United States Patent [19]
Tiegs et al.

[11] Patent Number: 5,235,729
[45] Date of Patent: Aug. 17, 1993

[54] ADJUSTABLE CLAMP

[76] Inventors: Del V. Tiegs; Randy G. Tiegs, both of 15878 E. Wind Cir., Sunrise, Fla. 33326

[21] Appl. No.: 936,683

[22] Filed: Sep. 3, 1992

[51] Int. Cl.⁵ .............................................. B65D 63/00
[52] U.S. Cl. ................................ 24/20 CW; 24/20 R; 24/23 EE
[58] Field of Search ............ 24/20 R, 20 CW, 20 EE, 24/20 W, 23 W, 23 EE, 279

[56]  References Cited
U.S. PATENT DOCUMENTS

| | | | |
|---|---|---|---|
| 2,249,764 | 7/1941 | Hothersall | 24/20 EE |
| 3,889,411 | 6/1975 | Laugherty et al. | 40/633 |
| 4,237,584 | 12/1980 | Oetiker | 24/20 CW |
| 4,492,004 | 1/1985 | Oetiker | 24/20 W |
| 4,514,882 | 5/1985 | Lavielle | 24/30.5 P |
| 4,998,326 | 3/1991 | Oetiker | 24/20 CW |
| 5,105,509 | 4/1992 | Lilley | 24/20 CW |

*Primary Examiner*—Victor N. Sakran
*Attorney, Agent, or Firm*—Robert C. Kain, Jr.

[57] ABSTRACT

The adjustable band clamp includes a single, elongated, narrow width band of metal having at one end thereof a plurality of cut-out windows. A crimpible, protruding band region is disposed immediately inboard the plurality of windows. Preferably, the crimpible protruding band region is a raised, U-shaped region having a central depression on its raised platform portion. At the other end of the band and disposed at predetermined longitudinal intervals over the substantial length of the band, a plurality of groups of protruding ears or extending notch fingers rise above the outer surface of the band. In operation, one or more ears from a simple group of longitudinally spaced apart ear sets are locked into the cut-out window. Since the operator can select a single group of ears close to the end of the band or a group in the mid-region or a group near the crimpible band region (the most inboard band region), a single band clamp can be used for large diameter boots, hoses, and plastic piping or small diameter boots, hoses or plastic piping.

4 Claims, 3 Drawing Sheets

ADJUSTABLE CLAMP

BACKGROUND OF THE INVENTION

The present invention relates to an adjustable clamp and a method for clamping sealable, pliable type material such as constant velocity boots (rubber boots placed about axles of motor vehicles), hoses and plastic piping.

Adjustable band clamps have been previously configured as narrow bands of metal, preferably stainless steel, having at one end thereof a plurality of cut-out windows and having at the other end thereof a plurality of raised ears protruding above the outer surface of the band wherein all the ears are disposed adjacent each other along an end region of the band. In order to clamp the known adjustable clamp to the sealable, pliable type materials, the prior art device is wrapped around the sealable and generally circular boot, hose, or plastic piping and one or more ears are positioned such that they protrude through one or more of the cut-out windows on the opposing side of the band. Additionally, the prior art adjustable band clamp may include a crimpible, protruding band region disposed inboard on the band beyond the cut-out windows. After the band is initially placed about the sealable boot, hose or piping, a crimping tool is used to crush the crimpible protruding band region longitudinally with respect to the length of the band thereby reducing the circumference of the band and increasing the radial compressive forces developed by the clamp on the sealable material.

These prior art adjustable band clamps were manufactured such that a single clamp could be used only for boots, hoses, and plastic piping having a certain size. Prior art band clamps could not be used for a wide range of diameters because the multiple ears located at one end of the band would not accommodate a wide range of boot, hose, and plastic piping diameters.

OBJECTS OF THE INVENTION

It is an object of the present invention to provide a single piece, adjustable band clamp.

It is another object of the present invention to provide a single piece, adjustable band clamp that utilizes group of ears wherein each group is spaced substantially uniformly throughout a significant length of the band such that a single band clamp can be used for a wide variety of sealable, pliable boots, hoses, and plastic piping.

It is a further object of the present invention to provide a band clamp which can be used for boot, hose and plastic piping diameters from approximately 1.9 inches through 4.7 inches.

SUMMARY OF THE INVENTION

The adjustable band clamp includes a single, elongated, narrow width band of metal having at one end thereof a plurality of cut-out windows. A crimpible, protruding band region is disposed immediately inboard the plurality of windows. Preferably, the crimpible protruding band region is a raised, U-shaped region having a central depression on its raised platform portion. At the other end of the band and disposed at predetermined longitudinal intervals over the substantial length of the band, a plurality of groups of protruding ears or extending notch fingers rise above the outer surface of the band. In operation, one or more ears from a single group of longitudinally spaced apart ear sets are locked into the cut-out window. Since the operator can select a singular group of ears close to the end of the band or a group in the mid-region or a group near the crimpible band region (the most inboard band region), a single band clamp can be used for large diameter boots, hoses, and plastic piping or small diameter boots, hoses or plastic piping.

BRIEF DESCRIPTION OF DRAWINGS

Further objects and advantages of the present invention may be found in the detailed description of the invention when taken in conjunction with the accompanying drawings in which.

DESCRIPTION OF THE INVENTION

The present invention relates to an adjustable band clamp.

Figure 1:
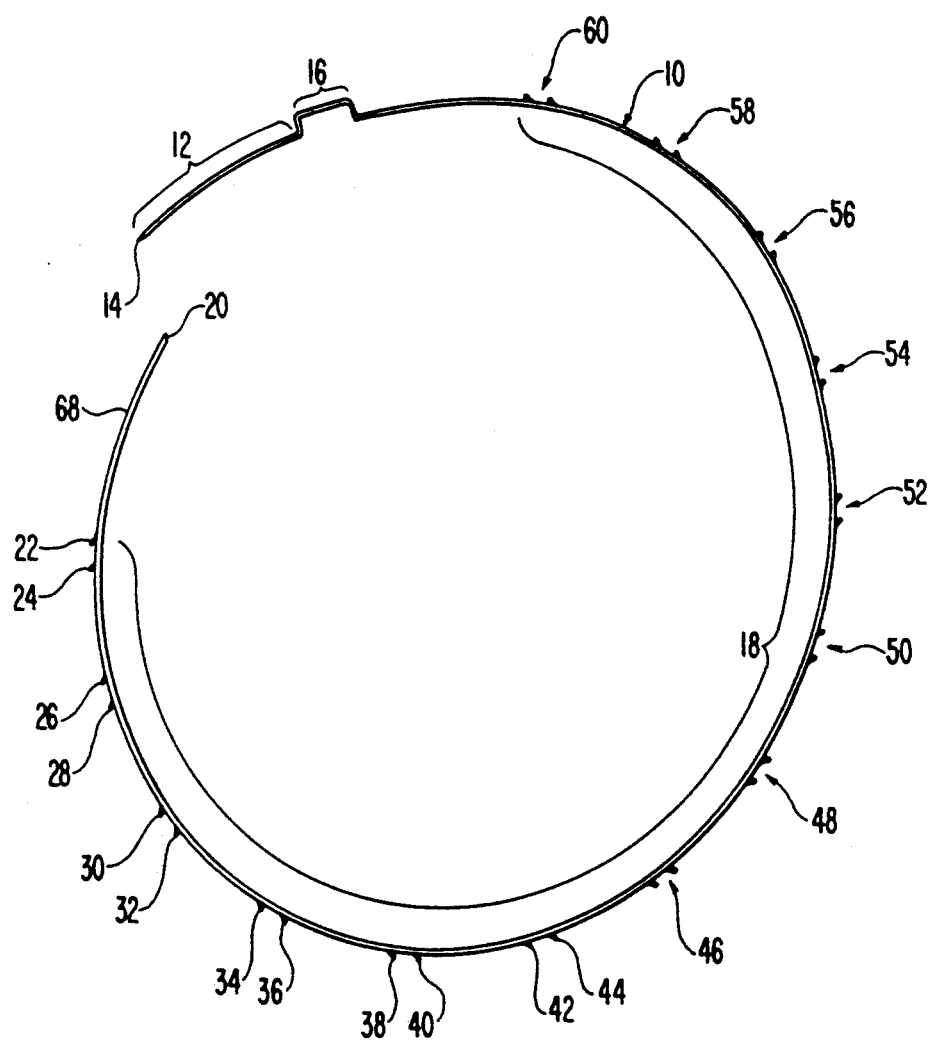
FIG. 1 diagrammatically illustrates the single piece, adjustable band clamp in an open position.

FIG. 1 illustrates a single piece, adjustable band clamp 10 having a window band region 12 near band end 14, a crimpible band region 16 disposed inboard end window band region 12, that is, away from end 14 and an ear bearing band region 18 spanning a significant portion of the length of the band. In the illustrated embodiment, ear band region 18 spans the entire length of the band except the crimpible band region 16 and the window band region 12. As described later, in operation, end 20 is wrapped inside the band such that end 14 over laps end 20 and one or more of ears, for example ears 22, 24 of the first group of ears are placed in the windows in window band region 12. The illustrated band clamp 10 includes longitudinally spaced pairs of ears beginning with ear pair 22, 24. In one embodiment, ear pair 22, 24 are longitudinally spaced from ear pair 26, 28 by approximately 1.0 inches. Similarly, ear pair 30, 32 are longitudinally spaced away from ear pair 26, 28 by approximately 1.0 inches. Ear pairs 30, 32; 34, 36; 38, 40; 42, 44 and pairs; 46; 48; 50; 52; 54; 56; 58 and 60 are similarly spaced apart. In a preferred embodiment, the ears are punched from a central region of the band and protrude above outer surface 68 of band 10 approximately 0.05 inches. The length of window region 18 is longer than the spacing between the ear groups. For example, the length of the window band region is about 1.25 inches.

Figure 2:
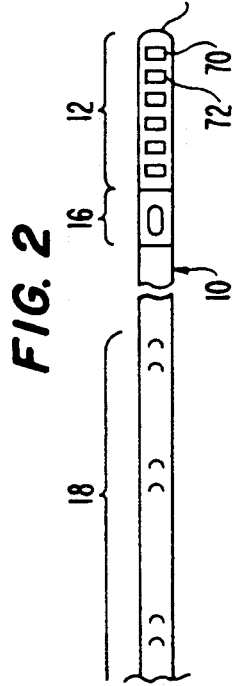
FIG. 2 diagrammatically illustrates the window band region, the crimpible band region and an inboard portion of the ear bearing region.
Figure 3:
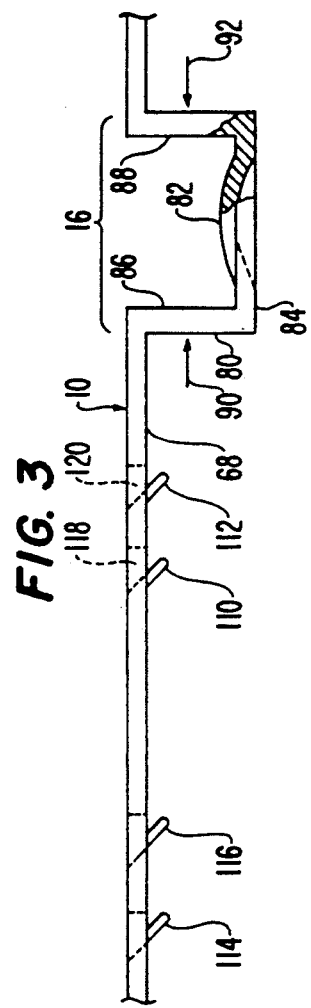
FIG. 3 diagrammatically illustrates a side elevational of the crimpible band region (with a partial, broken away view) and an inboard ear bearing region.
Figure 4:
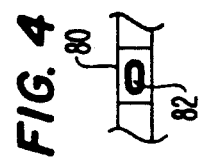
FIG. 4 diagrammatically illustrates a top view of the crimpible band region.

FIGS. 2 through 5 diagrammatically illustrates certain features of the adjustable band clamp. Similar numerals designate similar items throughout the drawings. FIG. 2 diagrammatically illustrates a top view showing window band region 12, crimpible band regions 16, and ear bearing band region 18. Band 10 has window cutouts, two of which are numerically identified as cutouts 70 and 72 near end 14 of the band. Immediately inboard or away from window region 12 and band end 14 is a crimpible band region 16. As shown in FIG. 3, crimpible band region 16 is a U-shaped structure 80 which protrudes above outer surface 68 of band 10. As diagrammatically illustrated in FIGS. 3 and 4, crimpible U-shaped structure 80 has a central region 82 that is depressed below the raised outer surface 84 of the crimpible structure 80. Central depression 82 permits the U-shaped structure 80 to collapse when a compressive force is applied to sides 86 and 88 as shown by arrows 90, 92. With this crimping action, the length of crimpible band region 16 is reduced thereby reducing the circumference of the band as a whole and increasing the compressive, radial force applied by the clamp band onto the boot, hose or plastic piping, that is, the sealable, pliable material. Other crimpible structures could be used such as structures which are V-shaped or W-shaped.

FIG. 3 also illustrates ear pairs 110, 112 and 114, 116. In a preferred embodiment, the ears are punched from a central region of band 10 as shown by the dashed lines indicating central ear punch holes or passages 118 and 120 for ears 110 and 112, respectively.

Figure 5:
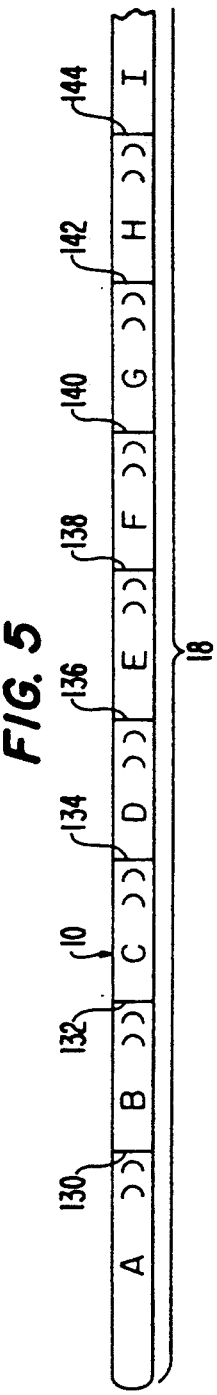
FIG. 5 diagrammatically illustrates the other end of the band and particularly the ear bearing band region with indicia showing clamp size and indicia trim lines.

FIG. 5 diagrammatically illustrates clamp band 10 and ear bearing band region 18 having clamp diameter size indicia A, B, C, D, E, F, G, H and I as well as trim indicia 130, 132, 134, 136, 138, 140, 142 and 144. Clamp diameter indicia A, B etc, refers to the outer diameter of the constant velocity boot, hose, plastic piping or other sealable, pliable type material to be clamped by the band clamp. Trim line indica, 130, 132 etc., refers to the location where the operator would cut or trim the end of the band clamp. A Small Clamp Size Table and Large Size Table follow showing exemplary dimensions for the sealable item to be clamped by band clamp 10.

| Small Clamp Size Table | |
|---|---|
| Indicia | Seal Dimensions (inches) |
| A | 1.94–1.70 |
| B | 1.64–1.40 |
| C | 1.35–1.11 |
| D | 1.05–0.81 |

| Large Clamp Size Table | |
|---|---|
| Indicia | Seal Dimension (inches) |
| A | 4.75–4.51 |
| B | 4.45–4.22 |
| C | 4.16–3.92 |
| D | 3.86–3.63 |
| E | 3.57–3.33 |
| F | 3.27–3.03 |
| G | 2.97–2.74 |
| H | 2.68–2.44 |
| I | 2.38–2.14 |
| J | 2.09–1.85 |

From these tables, it is apparent that with respect to the larger clamp, the clamp can be used for boots, hoses, plastic piping and other sealable materials having an outer diameter between 4.75 and 1.85 inches. This is a significant improvement over prior art band clamps which only work with outer diameters between 4.8 inches and, for example, 4.5 inches. The small clamp size is used because with the large clamp size, very small diameters are difficult to handle.

Figure 6:
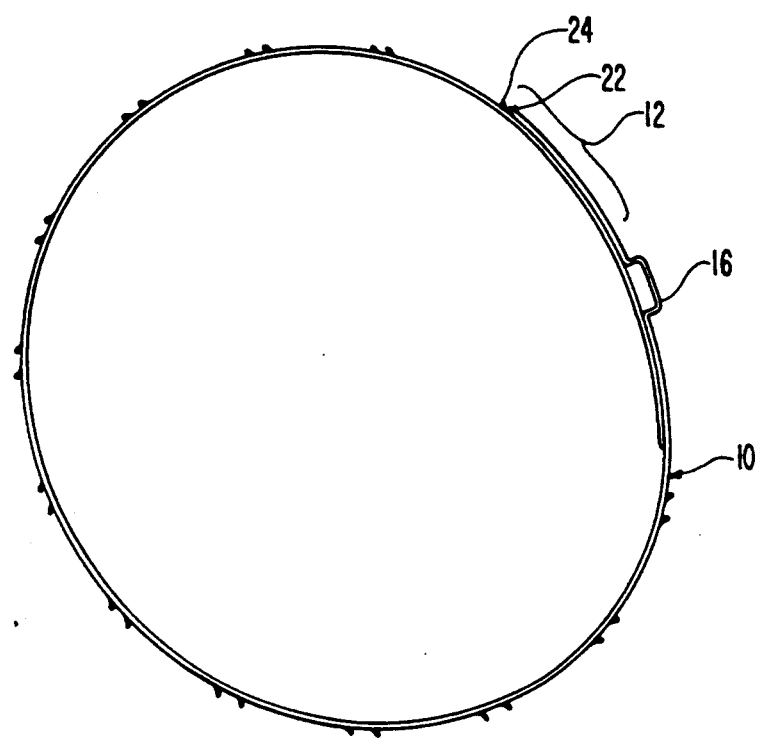
FIGS. 6 and 7 illustrate a single adjustable band clamp initially sized for a large diameter boot, hose or plastic piping and subsequently sized for a small diameter boot, hose or plastic piping respectively.

FIG. 6 illustrates a large diameter clamp with a crimpible band region 16 and a window region 12 wherein ear 22 protrudes through the first window (not shown) in window band region 12. The second ear 24 of this first ear pair does not protrude through another window in the window band region 12. After clamp band 10 is placed about the sealable item, a crimping action as shown by the force vectors 90, 92 in FIG. 3, is applied to crimpible band region 16 thereby reducing the diameter of the crimp region and reducing the circumference of the clamp. This increases the compressive, radially directed force on the clamped item.

Figure 7:
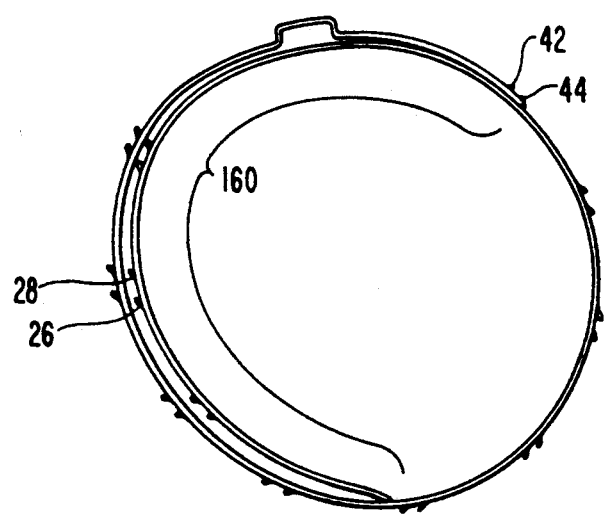

FIG. 7 illustrates the same large clamp, however, ear 42 has been inserted through one of the windows thereby forming a band clamp having a much smaller diameter as compared with the band clamp illustrated in FIG. 6. In the preferred embodiment, end region 160 maybe trimmed or the ears in end region 160 such as ears 26, 28 could be flatten after the operator initially selects a pair or group of ears for the item to be clamped. The ears in region 160 can be flatten with a pair of pliers or other suitable tool.

It should be noted that rather than have two pair of ears in each group, each group may include one ear or may include 4 or 5 ears. It is important to note that each group of ears must be longitudinally spaced apart along a substantial portion of the length of the band in order to accommodate a wide variety of diameters for clamped item.

Also, rather than a crimpible region, a screw could be used between movable vertical faces 86, 88 of a tightening mechanism. Further, the region 16 may be pinched rather than crimped.

The claims appended hereto are meant to cover modification and changes within the scope and spirit of the present invention.

What is claimed is:

1. An adjustable band clamp comprising:
   an elongated band having an imaginary longitudinal centerline, a window band region, forming cut-out windows, at one end thereof, a crimpible band region having means for longitudinally collapsing upon application of compressive force, said crimpible band region disposed adjacent and inboard of said window band region, and an ear bearing band region extending from another end of said band and spanning a significant portion of the length of said band;
   said ear bearing band region having a multiplicity of groups of ears, each group having at least two ears each, said multiplicity of groups sequentially spaced along the length of said ear bearing band region, each ear protruding along said longitudinal centerline of said band, each group of ears being spaced from an adjacent group of ears by a predetermined intergroup distance which exceeds the longitudinal span of all intragroup spacings between ears in each respective group of ears, such that select ears catch corresponding windows in said window band region thereby forming a clamp with said band.

2. An adjustable band clamp as claimed in claim 1 including indicia placed on said band designating a respective clamp size for each group of ears.

3. An adjustable band clamp as claimed in claim 2 including trimming indicia placed on said band for each group of ears.

4. An adjustable band clamp as claimed in claim 3 wherein the length of said window band region is longer than said predetermined intergroup distance between said groups of ears.

* * * * *